US010664034B2

(12) United States Patent
Nguyen et al.

(10) Patent No.: US 10,664,034 B2
(45) Date of Patent: May 26, 2020

(54) COMMUNICATION ASSOCIATED WITH MULTIPLE NODES FOR DELIVERY OF POWER (71) Applicant: HEWLETT PACKARD ENTERPRISE DEVELOPMENT LP, Houston, TX (US)

(72) Inventors: Hai Ngoc Nguyen, Spring, TX (US); Han Wang, Sugar Land, TX (US); Patrick A Raymond, Houston, TX (US); Raghavan V Venugopal, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 185 days.

(21) Appl. No.: 15/119,811

(22) PCT Filed: Apr. 28, 2014

(86) PCT No.: PCT/US2014/035754
§ 371 (c)(1),
(2) Date: Aug. 18, 2016

(87) PCT Pub. No.: WO2015/167442
PCT Pub. Date: Nov. 5, 2015

(65) Prior Publication Data
US 2017/0052582 A1 Feb. 23, 2017

(51) Int. Cl.
*G06F 1/30* (2006.01)
*G06F 1/26* (2006.01)
(52) U.S. Cl.
CPC ............... *G06F 1/30* (2013.01); *G06F 1/263* (2013.01); *G06F 1/266* (2013.01)

(58) Field of Classification Search
CPC ........................................................ G06F 1/32
See application file for complete search history.

(56) References Cited

U.S. PATENT DOCUMENTS

| 6,928,560 B1 * | 8/2005 | Fell, III ................. G06F 1/206 307/43 |
| 8,503,149 B2 | 8/2013 | Spitaels et al. |
| 2002/0062454 A1 | 5/2002 | Fung |
| 2008/0266758 A1 * | 10/2008 | Hurt ......................... F03D 9/00 361/625 |

(Continued)

FOREIGN PATENT DOCUMENTS

| CN | 202906249 | 4/2013 |
| EP | 2439610 | 4/2012 |

OTHER PUBLICATIONS

PCT/ISA/KR, International Search Report ISRWROP, dated Jan. 12, 2015, PCT/US2014/035754.

(Continued)

*Primary Examiner* — Jaweed A Abbaszadeh
*Assistant Examiner* — Keshab R Pandey
(74) *Attorney, Agent, or Firm* — Hewlett Packard Enterprise Patent Department (57) ABSTRACT Examples herein disclose receiving a communication indicating a number of loads supported by multiple nodes and determining an amount of power available at a backup power source. Based on the determination of the amount of power, the examples disclose delivering power to the multiple nodes from the backup power source.

16 Claims, 5 Drawing Sheets (56) References Cited

U.S. PATENT DOCUMENTS

| | | | |
|---|---|---|---|
| 2009/0234512 A1* | 9/2009 | Ewing | H04L 12/10 |
| | | | 700/295 |
| 2010/0100762 A1* | 4/2010 | Carlson | H04J 3/0641 |
| | | | 714/4.1 |
| 2010/0280676 A1 | 11/2010 | Pabon | |
| 2010/0295513 A1 | 11/2010 | McCollum | |
| 2011/0066727 A1 | 3/2011 | Palmer | |
| 2011/0082598 A1 | 4/2011 | Boretto et al. | |
| 2012/0056481 A1 | 3/2012 | Corhodzic | |
| 2013/0346762 A1* | 12/2013 | Hodges | H01M 10/4257 |
| | | | 713/300 |
| 2014/0029167 A1* | 1/2014 | Degli Innocenti | H01H 71/0271 |
| | | | 361/615 |
| 2014/0062191 A1* | 3/2014 | Bryson | H02J 1/12 |
| | | | 307/26 |
| 2014/0192653 A1* | 7/2014 | Jung | H04L 67/1002 |
| | | | 370/236 |

OTHER PUBLICATIONS

WEBENCH® System Power Architect, (Web Page), Jun. 8, 2012, 3 pps. http://www.ti.com/lsds/ti/analog/webench/system-power-architect.page.

* cited by examiner

COMMUNICATION ASSOCIATED WITH MULTIPLE NODES FOR DELIVERY OF POWER

BACKGROUND

As reliance on computing systems continues to grow, so does a demand for reliable power and back-up schemes for these computing systems. Servers, for example, may provide architectures for backing up data to memory and providing back-up power sources for powering the back-up data after the loss of power. Back-up power sources may include components such as capacitors and/or batteries.

BRIEF DESCRIPTION OF THE DRAWINGS

In the accompanying drawings, like numerals refer to like components or blocks. The following detailed description references the drawings, wherein.

DETAILED DESCRIPTION

In a backup power system, a primary power supply may support loads until experiencing a failure at which point, a battery module internal to a backup power source may be designated to support the loads. In the backup power system, the backup power source may have a one-to-one correspondence with a node, such as a server. This backup power system lacks load flexibility at each of the nodes and may cause catastrophic failure if the backup power system fails. In another backup power system supporting multiple nodes, each of the multiple nodes may include a separate management module which creates much communication traffic.

To address these issues, examples disclose a power system for support in a backup power system between a backup power source and multiple nodes. The examples provide different centralized structures for direct or indirect communication among the multiple nodes and the backup power source. In one example, the backup power source may receive direct communications regarding load information from each of the multiple nodes. Based on the communications, the backup power source may deliver power to the multiple nodes. In this example, the backup power source serves as a centralized communication to receive load information from each of the multiple nodes.

In another example, each of the multiple nodes may communicate with a virtual controller and the virtual controller communicates to the backup power source to deliver power to the multiple nodes. In this example, the virtual controller receives communications directly from each of the multiple nodes. This implementation allows a single entity, in this case the virtual controller, to know load specifics at each of multiple nodes and arrange power distribution.

In a further example, a centralized controller may communicate with each of the multiple nodes and/or the virtual controller. The centralized controller communicates with multiple backup power sources to determine which of the multiple backup power sources should deliver the power to the multiple nodes. The centralized controller provides a level of abstraction among the multiple backup power sources to ensure power is delivered to the multiple nodes in case one of the multiple backup power sources suffers a failure. This example additionally provides robustness in the sense of enabling another multiple backup power source to provide the power to the multiple nodes.

Additionally, the multiple nodes may each correspond to a different server thus communicating load information to the backup power source. Such load information may include power consumed by loads at each the servers, a number of loads supported by each of the multiple servers, and/or the number of loads supported by the overall multiple servers. In this manner, the backup power source may deliver power to the multiple servers in case of an outage at one of the servers. Each of the multiple servers may support various loads such as storage, controllers, processors, and/or other components for functioning. Certain loads may not afford shut down and/or to be taken down in the situation of power outage. Thus, each of the multiple servers may communicate this information to the controller.

In another implementation, the backup power source operates as a master device while each of the multiple nodes may operate as a slave device. Creating the master slave reduces traffic that may be associated with multiple masters.

Figure 1:
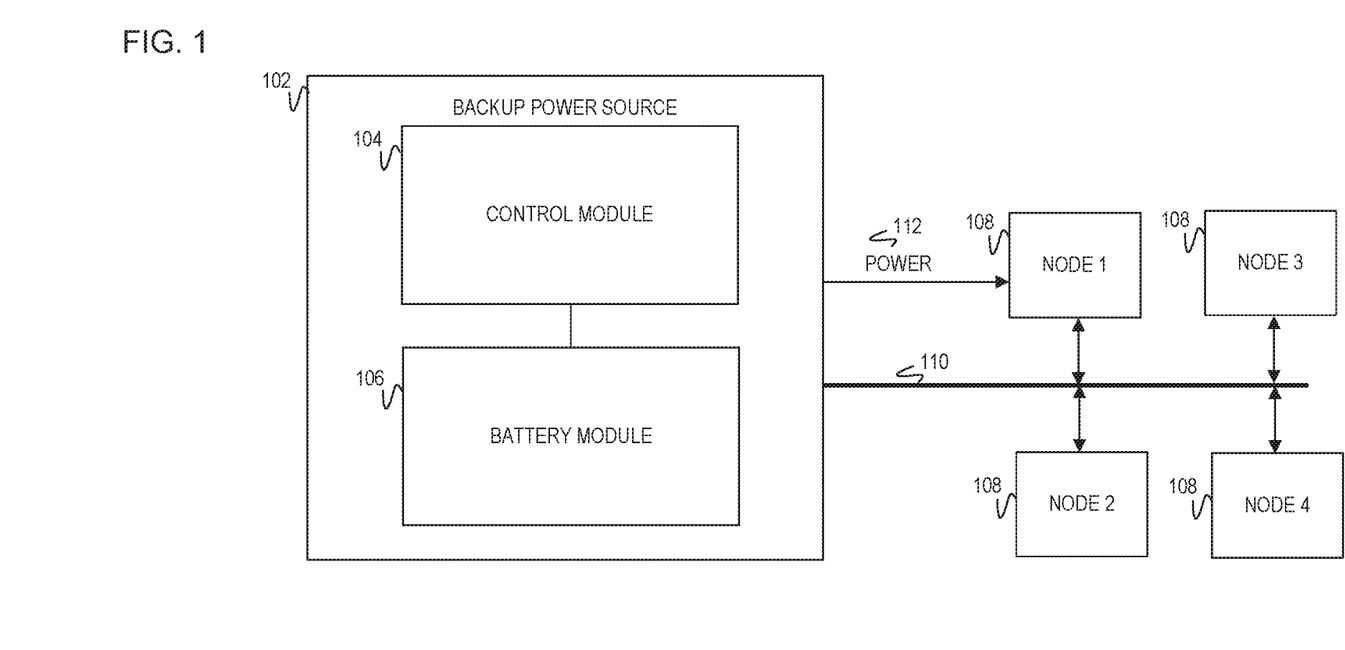
FIG. 1 is a block diagram of an example power system including a backup power source module to receive a communication from multiple nodes and in turn deliver power to the multiple nodes.

In summary, examples disclosed herein provide a power system for support between multiple backup power sources and multiple nodes. The power system provides a centralized communication structure that provides flexibility to supporting the various nodes and reduces bus traffic, thus providing an overall more efficient power system Referring now to the figures, FIG. 1 is a block diagram of an example power system including a backup power source 102 to receive communications over a communication bus 110 associated with multiple nodes 108. A control module 104 within the backup power source 102 may receive the communications associated with the multiple nodes 108 and in turn measure an amount of power available at the backup power source 102. The control module 104 measures an amount of power available at the backup power source 102 to determine whether the backup power source 102 may have enough power at a battery module 106 to deliver power 112 to the multiple nodes 108. Delivering power 112 to the multiple nodes 108 enables the nodes to support its respective loads. The communication delivered over the communication bus 110 may indicate a number of loads supported by each of the multiple nodes 108 and/or the number of loads supported by the overall multiple nodes 108. In this manner, the backup power source 102 may deliver power 112 to one or more of the multiple nodes in case of power outage. Each of the multiple nodes 108 may support various loads such as storage, controllers, processors, and/or other components for functioning of each of the multiple nodes 108. For example, the multiple nodes 108 may include multiple servers. Thus to maintain functioning of the components internal to each of the servers, power 112 may be provided to each of the servers. In this implementation, the multiple servers utilize the backup power source 102 to receive operations and load specifics to arrange power distribution. Each of the multiple nodes 108 may communicate information including the number of loads, power supported by the number of loads, etc. Certain loads supported by the multiple nodes 108 may not afford shut down and/or may be taken offline in the situation of the power outage. Thus, each of the multiple nodes 108 may communicate this information to the control module 104. In another implementation, the communication may include power consumption for support of the multiple loads.

Although FIG. 1 illustrates the backup power source 102 as receiving the communication, implementations should not be limited as this was done for illustration purposes. For example, a centralized controller which may group a cluster of multiple backup power sources may receive communications from multiple nodes 108. These examples are explained in detail in later figures. Additionally, although FIG. 1 illustrates components 102 and 108, implementations should not be limited as FIG. 1 may also include a virtual controller and/or the centralized controller. In one implementation, the backup power source 102 may include a backup power system to support multiple servers. As such, implementations of the backup power source 102 include a power circuit, embedded system, power supply system, computing system, distributed power system, or other type of circuit system capable of supporting multiple nodes 108 (e.g., multiple servers). In this implementation, each server may communicate with the backup power source 102 to identify itself and the various components supported by that particular server. In this manner, the backup power source 102 may differentiate and allocate information to and from each of the multiple servers. Additionally, in this implementation, the backup power source 102 operates as the master device while each of the multiple servers operate as a slave device. This prevents communication traffic that may occur from multiple masters. Further, if the backup power source 102 is fully charged, the backup power source 102 may support the loads at each of the various servers.

The control module 104 is a device which may receive the communication from each of the multiple nodes 108. In one implementation, the control module 104 is a type of master device which receives communications from the multiple nodes 108 and instructs the battery module 106 to provide power 112 to the multiple nodes 108. In another implementation, the control module 104 operates as the centralized controller to receive communications from multiple backup power sources and multiple nodes 108. Yet in a further implementation, the control module 104 may receive communications from the virtual controller. The virtual controller communicates directly with each of the multiple nodes 108. Implementations of the control module 104 include a controller, processor, circuit logic, a microchip, chipset, electronic circuit, microprocessor, semiconductor, microcontroller, central processing unit (CPU), centralized controller, or other device capable of receiving the communication associated with the multiple nodes 108. Although FIG. 1 illustrates the control module 104 as internal to the backup power source 102, implementations should not be limited as the control module 104 may be located external to the backup power source 102. Additionally, the terminology including control module 104 and controller may be used interchangeably throughout the discussion of the figures.

The battery module 106 is an electrical device as part of the backup power source 102 that converts stored energy into electrical energy to provide the power 112 to one or more of the multiple nodes 108. As such, the battery module 106 may include a capacitor or other components to provide power 112. The stored energy within the battery module 106 is a potential difference which allows the flow of electrons to produce the power 112. In this implementation, to generate the potential difference, the battery module 106 may obtain an input power from a primary power supply (not illustrated). Thus, when the primary power supply fails, the battery module 106 may no longer be charged, thus causing the battery module 106 to act as the backup power source 102 to the multiple nodes 108.

The communication bus 110 is a communication system which may transfer data between the control module 104 and the multiple nodes 108. As such, the communication bus 110 may include a transmission medium in which to transfer data. For example, the transmission medium may include fiber optics, cables, etc. In one implementation, the communication bus may transfer data between each of the multiple nodes 108 and the virtual controller. In another implementation, the communication bus 110 may include an inter-integrated circuit ($I^2C$) communication bus. In this implementation, the control module 104 operates as a master device while each of the multiple nodes 108 operate as slave devices.

The multiple nodes 108 each represent a computing device where the communication bus 110 may intersect at each computing device. Specifically, each of the multiple nodes 108 are electrical components within the power system that consume power 112 and in return, provide functionality. For example, each of the multiple nodes 108 may include a computing device, a server, a networking switch, a networking device, etc. In one implementation, each of the multiple nodes 108 corresponds to a different server. For example, node 1 may correspond to first server, node 2 may correspond to a second server, etc. Although FIG. 1 illustrates four multiple nodes 108 implementations should not be limited as multiple nodes 108 may include two or more multiple nodes 108.

The power 112 is a flow of electrical charge from the battery module 106 to at least one of the multiple nodes 108. As such, each of the multiple nodes 108 consume power and in return provide functionality. The power 112 may be provided by the battery module 106 within the backup power source 102 when one or multiple nodes 108 are experiencing a potential power outage. To continue to provide functionality, the one or more multiple nodes 108 may communicate the potential power outage over the communication bus 110 to the backup power source 102. To maintain the functionality, each of the multiple nodes may also communicate each of their respective loads including memories, processors, controllers, etc. to the control module 104 within the backup power source 102.

Figure 2:
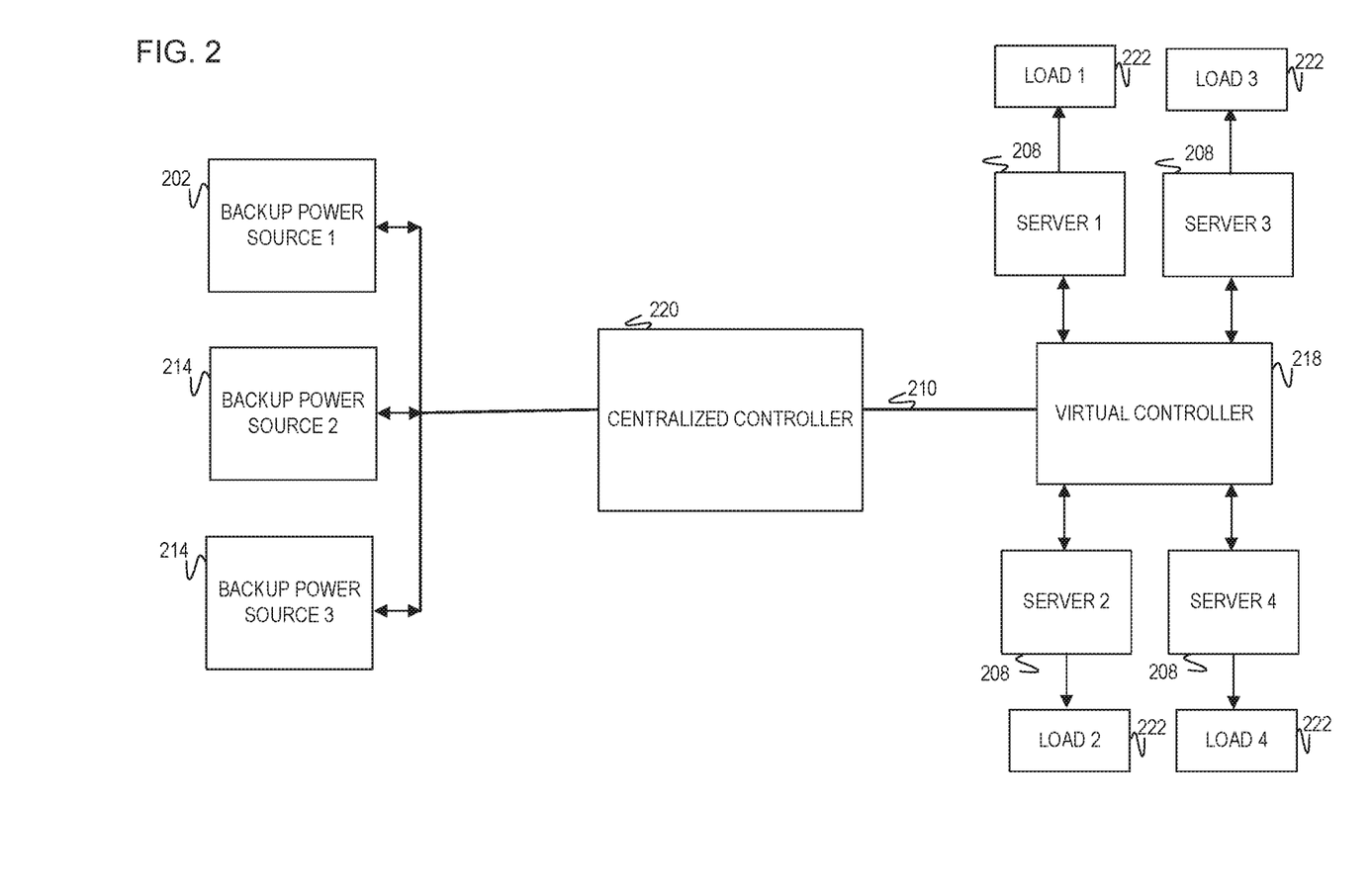
FIG. 2 is a block diagram of an example power system including a virtual controller to communicate between a centralized controller and multiple servers, the centralized controller communicates among multiple backup power sources.

FIG. 2 is a block diagram of an example power system including a centralized controller 220 to communicate with multiple backup power sources 202 and 214. The centralized controller 220 may receive communications from a virtual controller 218 which communicates directly with each of the multiple servers 208 over a communication bus 210. Each of the multiple servers 208 may support various loads 222 for maintaining functionality. The centralized controller 220 communicates with each of the multiple backup power sources 202 and 214 to determine which of the multiple backup power sources 202 and 214 should deliver power (not illustrated) to the multiple servers 208. In one implementation, the virtual controller 218 receives communications directly from each of the multiple servers 208. This implementation allows a single entity, in this case the virtual controller 218, to know load specifics at each of the servers 208 and arrange power distribution to each of the servers 208 and in turn their respective load 222, In another implementation, the centralized controller 220 may receive communications including load information from each of the multiple servers 208 and/or the virtual controller 218. These implementations illustrate how the power system may accommodate load dynamics when one of the servers 208 experiences a power outage. The multiple backup power sources 202 and 214 may be similar in structure and functionality to the backup power source 102 as in FIG. 1. Additionally, the communication bus 210 may be similar in structure and functionality to the communication bus 110 as in FIG. 1. Each of the loads 222 represents components for each of the respective multiple servers 208 to support. As such, examples of the loads 222 include hardware components such as memory devices, etc.

The centralized controller 220 is a hardware abstraction which may cluster together the multiple backup power sources 202 and 214 with a unified interface to communicate with either the virtual controller 218 and/or the multiple servers 208. The centralized controller 220 collects available information about the loads 222 from either the multiple servers 208 and/or the virtual controller 218. The load information may include the power consumed by each of the loads 222, the number of loads, or the type of loads 222. The centralized controller 220 provides robustness to the power system to cover the situation when one of the multiple backup power sources 202 and/or 214 may suffer a failure. This ensures the multiple servers 208 may continue functioning by continuing to receive power. In one implementation, the centralized controller 220 communicates with a control module at each of the backup sources 202 and 214 to distribute power from at least one of these sources 202 and 214 for delivery to the multiple servers 208 upon the power outage. In this implementation, the centralized controller may include a register internal to the centralized controller 220 or one of the backup power sources 202 or 214. The centralized controller 202 may write a value corresponding to a number of loads supported by the overall servers 208 or each of the servers 208. Implementations of the centralized controller 202 include processor, circuit logic, a microchip, chipset, electronic circuit, microprocessor, semiconductor, microcontroller, central processing unit (CPU), centralized controller, or other device.

The virtual controller 218 is a software-based emulation of a controller operating on a chassis manager (not illustrated). In this regard, the virtual controller 218 operates as part of the chassis manager to communicate directly with each of the multiple servers 208. The virtual controller 218 may be used as direct communication with each of the servers 208 as another design option in the situation where a designer may not desire direct communication from each of the servers to the backup power sources 202 and 214. This provides an additional intelligence component to manage operations for distribution of power between backup power sources 202 and 214 and the multiple servers 208. Implementations of the virtual controller 218 include an instruction, set of instructions, process, operation, logic, technique, function, firmware, and/or software executable by the chassis manager.

Figure 3:
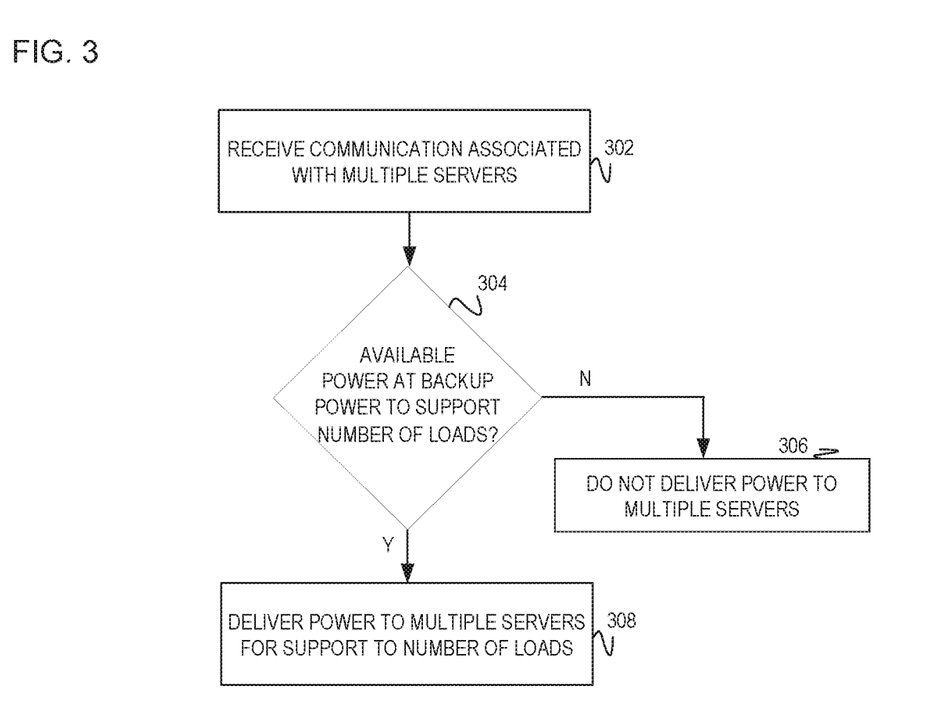
FIG. 3 is a flowchart of an example method executable by a controller to receive a communication associated with multiple servers, determine an amount of power available at a backup power source, and deliver power to the multiple servers.

FIG. 3 is a flowchart of an example method executable by a controller to receive a communication associated with multiple servers and determine an amount of power available at a backup power source. Depending on the amount of power available, the backup power source may either deliver power to the multiple servers or not deliver power to the multiple servers. The communication to the controller may indicate a number of loads, power consumption by the loads, and/or components within each of the loads supported by the multiple servers. In this manner, each of the multiple servers may communicate a status, condition, and other information associated with its respective loads. As such, the backup power source may deliver power to the multiple servers in case of an outage at one of the servers. Each of the multiple servers may support various loads such as storage, controllers, processors, and/or other components for functioning of each of the multiple servers. Certain loads supported by the multiple servers may not afford shut down and/or to be taken down in the situation of power outage. Thus, each of the multiple servers may communicate this information to the controller. FIG. 3 may be implemented on various centralized power architectures for delivering power the multiple servers. In each of these power architectures, the controller may be located in various areas of the system. For example, a first centralized power architecture may include each of the multiple servers communicating directly with the backup power source. In this example, the controller may be located within the backup power source to receive the communications from the multiple servers. A second centralized power architecture may include each of the multiple servers communicating to a virtual controller on a chassis manager. The virtual controller may then communicate with controller within the backup power source to deliver power to the multiple servers which may have experienced the power outage. A third centralized power architecture may include the controller as part of a centralized controller which communicates with multiple backup power sources and may receive communications directly from each of the multiple servers. The centralized controller may communicate with multiple backup power sources to deliver power to the multiple servers. In this example, one of the multiple backup power sources may suffer a failure, thus communicating with the centralized controller, the centralized controller may accommodate for the failed backup power source to deliver power from one of the other multiple backup power sources. This provides an additional aspect of robustness to the power system ensuring each of the multiple servers continue functioning. Further, in this example, the term controller and centralized controller may be used interchangeably. Specifically, FIG. 3 covers the first power architecture while the next figure discusses the next two power architectures in detail.

In discussing FIG. 3, references may be made to the components in FIGS. 1-2 to provide contextual examples. The method of FIG. 3 may be executed by a single component or combination of components illustrated in FIGS. 1-2. For example, the backup power source 102 as in FIG. 1 executes operations 302-308 to receive the communication from multiple servers and deliver power to the multiple servers based on the amount of power available at the backup power source. In another example, a virtual controller 218 as in FIG. 2 executes operations 302-308. Yet, in a further example, a centralized controller 220 as in FIG. 2 executes operations 302-308. Further, although FIG. 3 is described as implemented by the controller, it may be executed on other suitable components. For example, FIG. 3 may be implemented in the form of executable instructions on a machine-readable storage medium 504 as in FIG. 5.

At operation 302, the controller receives the communication associated with multiple servers. The communication may be received by the controller directly or indirectly. The communication may be received directly from each of the multiple servers, while the communication may be received indirectly from each of the multiple servers from being received directly from the virtual controller. In the direct communication scenario, the communication may received over an Inter-Integrated Circuit ($I^2C$) communication bus. The communication may include loads information such as the power consumption of the multiple loads, the number of loads, types of loads, etc. For example, the communication may indicate a number loads supported by the overall multiple servers or may indicate each of the number of loads supported by each of the multiple servers. In one implementation, the communication may be transmitted directly from each of the multiple servers. In this implementation, the communication may include an address of each of the multiple servers for the controller to track a location of each of the multiple servers and conditions of each of the multiple servers. This enables the controller to signal to the backup power source to deliver power to the multiple power servers in the situation where one of the multiple power servers suffers the power outage. The communication indirectly or directly from each of the multiple servers enables the controller to coordinate communications with each of the multiple servers and collect load information to supply power to those multiple servers which may not go offline without interrupting functionality of the power system. In a further implementation, the controller may be located within the backup power source and operate as a master device while each of the multiple servers operate as slave devices. In this implementation, the backup power source includes the intelligence to coordinate each of the multiple servers.

At operation 304, the controller determines the amount of power available at the backup power source. The controller may include a measuring device to measure the power available at the backup power source. In one implementation, if the amount of power available at the backup power source is not enough to support the number of loads from the multiple servers, the controller proceeds to operation 306 as does not deliver power to the multiple servers.

At operation 306, the controller indicates to the backup power source to not deliver power to the multiple servers. In one implementation, the backup power source may continue charging a battery module until enough power is available to support the loads from the multiple servers. In a further implementation, the controller may communicate with multiple backup power sources. In this implementation, the controller may have another multiple backup power source deliver the power to the multiple servers.

At operation 308, upon the determination of the available power at the backup power source, the controller signals to the backup power source to deliver the available power to the multiple servers. Operation 308 may include the controller removing loads from the supported multiple loads. In this implementation, the controller signals to the respective server which loads to support, etc.

Figure 4:
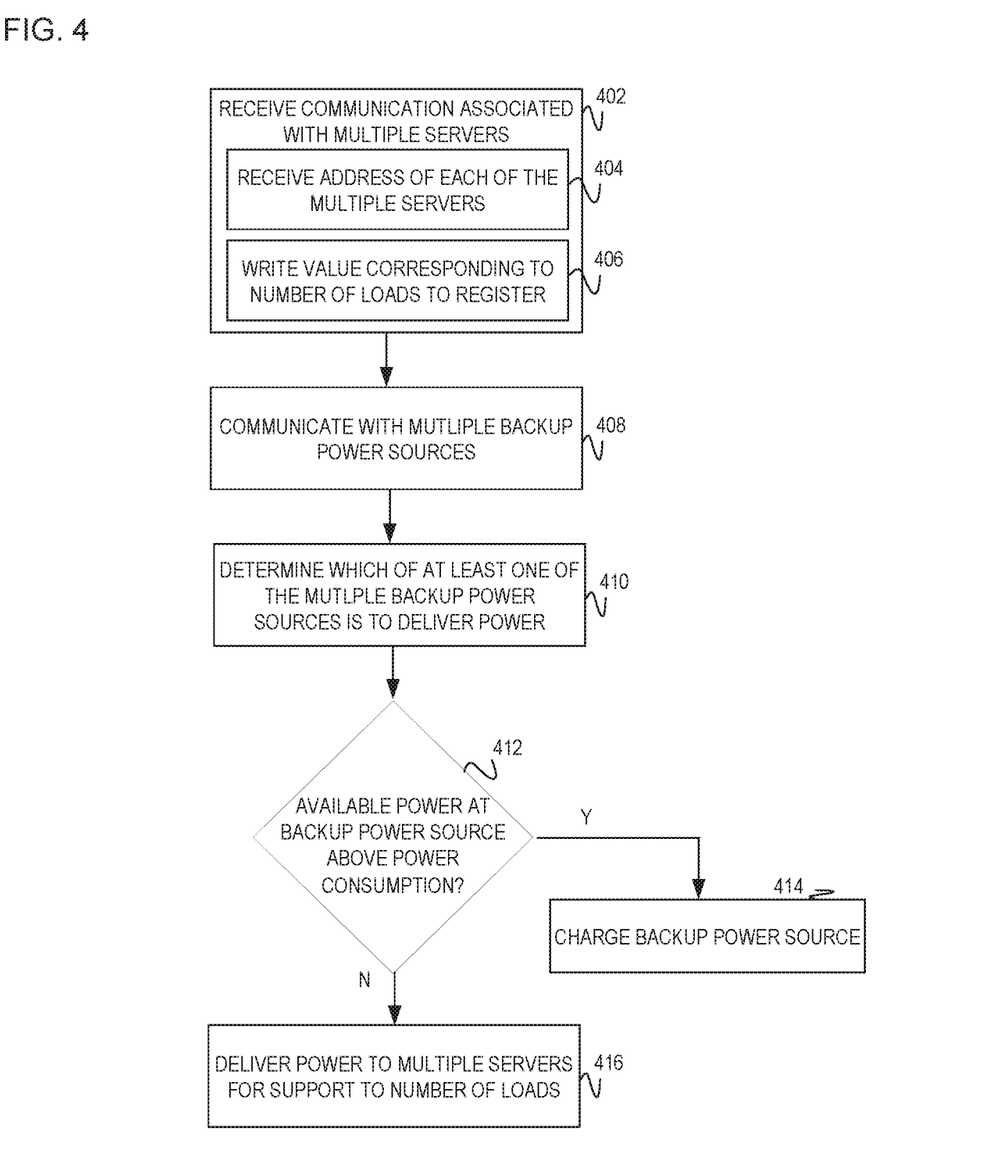
FIG. 4 is a flowchart of an example method executable by a controller to receive a communication associated with multiple servers and in turn communicate with multiple backup power sources to determine which one of the multiple backup power source are to deliver power to the multiple servers.

FIG. 4 is a flowchart of an example method executable by a controller to receive a communication associated with multiple servers. The communication may indicate a number of loads supported by each of the multiple servers and/or the number of loads supported by the overall multiple servers. In this manner, the backup power source may deliver power to the multiple servers in case of a power outage at one of the servers. Each of the multiple servers may support various loads such as storage, controllers, processors, and/or other components for functioning of each of the multiple servers. Each of the multiple servers may communicate information including the number of loads, power supported by the number of loads, etc. Certain loads supported by the multiple servers may not afford shut down and/or to be taken down in the situation of power outage. Thus, each of the multiple servers may communicate this information to the controller. In another implementation, the communication may include power consumption for support of the multiple loads. FIG. 4 represents the example method on different centralized structures for delivering power to multiple server(s). For example, FIG. 4 may be implemented in a power structure in which each of the multiple server(s) communicate directly with the backup power source. In this example, the controller may be located within the backup power source to receive the communications from the multiple servers. In another example, FIG. 4 may be implemented in another power structure in which each of the multiple server(s) communicate to a virtual controller on a chassis manager while the virtual controller may communicate with the controller. In this example, the virtual controller may communicate with the controller within the backup power source. The communication from the virtual controller may include load information such as the number of loads, power consumption by the loads, etc. In a further example, FIG. 4 may be implemented in another power structure in which each of the multiple servers may communicate with the virtual controller and/or centralized controller. The centralized controller may communicate with multiple backup power sources to deliver power to the at least one of the multiple servers. In this example, one of the multiple backup power sources may suffer a failure, thus communicating with the centralized controller, the centralized controller may accommodate for the failed backup power source to deliver power from one of the other multiple backup power sources. This provides an additional aspect of robustness to the power system ensuring each of the multiple servers continue functioning.

In discussing FIG. 4, references may be made to the components in FIGS. 1-2 to provide contextual examples. The method of FIG. 4 may be executed by a single component or combination of components illustrated in FIGS. 1-2. For example, the backup power source 102 as in FIG. 1 executes operations 402-416 to receive the communication from multiple servers and delivering power to the multiple power based on the amount of power available at the backup power source. In another example, a virtual controller 218 as in FIG. 2 executes operations 402-416. Yet, in a further example, a centralized controller 220 as in FIG. 2 executes operations 402-416. Further, although FIG. 4 is described as implemented by the controller, it may be executed on other suitable components. For example, FIG. 4 may be implemented in the form of executable instructions on a machine-readable storage medium 504 as in FIG. 5.

At operation 402, the controller may receive the communication associated with the multiple servers. The communication may include the number of loads supported by each of the multiple servers and/or the number of loads supported by the overall multiple servers. The power architecture implemented with FIG. 4 may depend on from where the controller receives the communication. For example, the controller may receive the communication from the virtual controller, from each of the multiple servers, and/or the centralized controller. In one implementation, the communication received by the controller may include an address of each of the multiple servers as at operation 404. This enables the controller to identify the location of each of the multiple servers. In another implementation, the controller may write a value to a register corresponding to the number of loads supported by each of the multiple servers and/or the value corresponding to the overall number of loads supported by the multiple servers as at operation 406. Operation 402 may be similar in functionality to operation 302 as in FIG. 3.

At operation 404, the controller may receive the address of each of the multiple severs as part of the communication received at operation 402. Receiving the address of each of the multiple servers, the controller may identify each of the multiple servers and a location of each of the multiple servers. This further enables the controller to track loads from each of the multiple servers. Additionally, operation 404 enables the controller to also track each of the multiple servers and whether one of the multiple servers may be suffering a power issue.

At operation 406, the controller may write the value to the register. The value may correspond to the number of loads supported by the overall multiple servers and/or the number of loads supported by each of the multiple servers.

At operation 408, the controller communicates with multiple backup power sources. Upon receiving the communication at operation 402 indicating the number of loads for support, the controller may communicate with multiple backup power sources. Communicating with the multiple backup power sources, the controller may be part of the centralized controller. In this implementation, the centralized controller may track whether the backup power source may suffer a failure and signal to another backup power source to deliver power to the multiple servers.

At operation 410, the controller may communicate with the multiple backup power sources to determine which of the multiple backup power sources may deliver power to the multiple servers.

At operation 412, the controller determines the amount of power available at the backup power source. If the amount of power available is below a particular threshold, the controller may signal to the backup power source to continue charging a battery module within the backup power source as at operation 414. If the controller determines the backup power source is at or above the particular threshold, the controller may indicate to the backup power source to deliver power to at least one of the multiple servers as at operation 416. Operation 412 may be similar in functionality to operation 304 as in FIG. 3.

At operation 414, upon determining the available power is below a threshold for power consumption by the loads supported by the servers, the controller signals to the backup power source to charge a battery module. The backup power source may continue charging the battery module until enough power is available to deliver to at least one of the multiple servers. In one implementation, operation 414 may be similar to operation 306 as in FIG. 3 in the sense that the backup power source does not deliver power to the multiple servers. In this implementation, the backup power source may charge a battery module within the backup power source until the backup power source may deliver enough power to the multiple servers to enable the servers to support their respective loads. In another implementation, upon charging the battery module, the backup power source may wait until a particular time period with charging the battery module which may allow a capacitor to collect enough charge to deliver the power to the multiple servers. In a further implementation, operation 414 includes determining the amount of power available at operation 412 is below a particular threshold, such as below a particular power consumption for the particular server(s). For the amount of power to fall below the particular threshold and/or power consumptions indicates the servers may not be able to support their load to maintain functionality within the servers. In this implementation, the server(s) may go offline until the backup power source may support the server(s) or in other words, until the backup power source is above the power consumption and/or above the particular threshold. Yet, in a further implementation, if the backup power source may not have enough available charge, the centralized controller may communicate with another backup power source to have that other backup power source to deliver power while the backup power source may continue charging.

At operation 416, upon determining the available power at operation 412, the backup power source delivers power to at least one of the multiple servers. The delivery of power to the at least one of the multiple servers enables that particular server to support its respective loads. Enabling the particular server to support its loads, the backup power source provides a type of centralized backup power architecture for backup power communication and distribution. Operation 416 may be similar in functionality to operation 308 as in FIG. 3.

Figure 5:
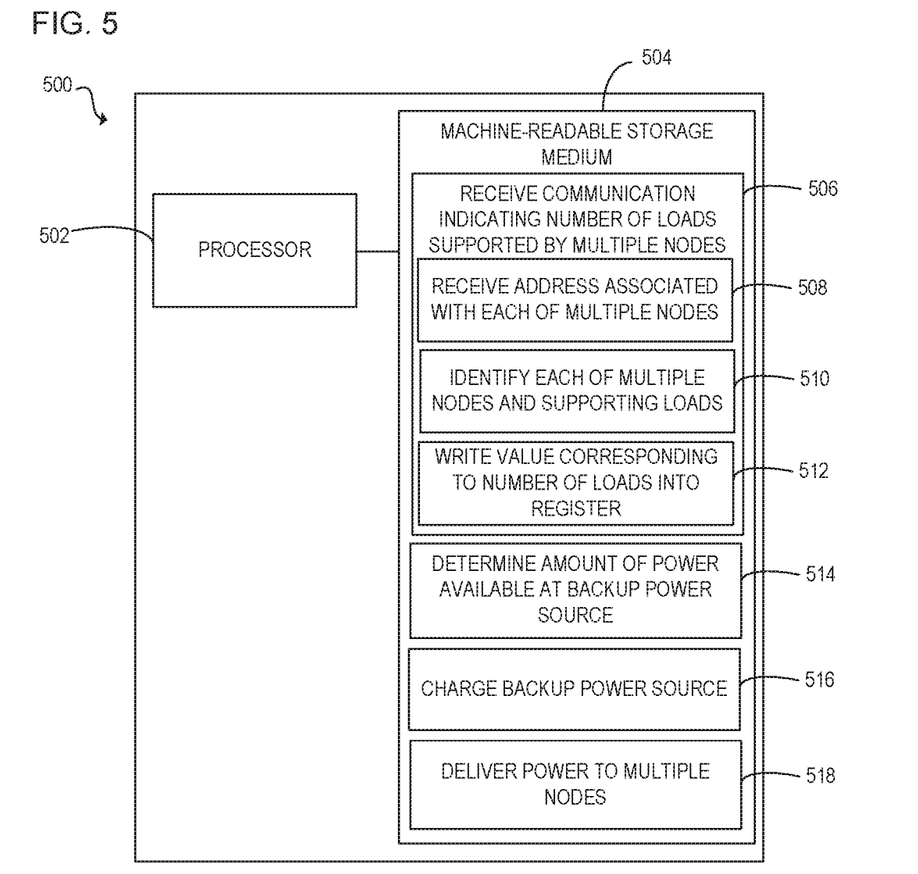
FIG. 5 is a block diagram of an example computing device with a processor to execute instructions in a machine-readable storage medium for receiving a communication indicating a number of loads supported by multiple nodes and deliver power to the multiple nodes to enable power support of the number of loads.

FIG. 5 is a block diagram of computing device 500 with a processor 502 to execute instructions 506-518 within a machine-readable storage medium 504. Specifically, the computing device 500 with the processor 502 is to communicate with multiple nodes (e.g., servers) within a system and determine an amount of power available at a backup power source. If the backup power source does not have enough power to support one of the multiple servers to enable the servers to support their respective loads, the backup power source may continue charging until enough power is available. Although the computing device 500 includes processor 502 and machine-readable storage medium 504, it may also include other components that would be suitable to one skilled in the art. For example, the computing device 500 may include the backup power source 102 as in FIG. 1. The computing device 500 is an electronic device with the processor 502 capable of executing instructions 506-518, and as such embodiments of the computing device 500 include a mobile device, client device, personal computer, desktop computer, laptop, tablet, video game console, or other type of electronic device capable of executing instructions 506-518. The instructions 506-518 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processor 502 may fetch, decode, and execute instructions 506-518 for receiving the communication from multiple servers indicating a number of loads for support at each of the loads. In turn, the instructions may proceed to determine the power available at the backup power source and deliver power to the multiple servers. The delivery of power to each of the multiple servers may enable each of the multiple servers to support their respective loads. If the backup power source does not have enough power available for the servers to support their respective loads, the backup power source may continue charging until enough power is available. In one implementation, instruction 506 may include executing the single instruction or combination of instructions 508-512. Upon executing instruction 506, the processor may proceed to execute instruction 514 for determining the amount of power available at the backup power source. In one implementation, upon executing instruction 514, the processor may proceed to instruction 516 to charge the backup power source. In another implementation, upon executing instruction 514 and/or 516, the processor proceeds to execute instruction 518 to deliver power to at least one of the multiple servers. Specifically, the processor 502 executes instructions 506-512 to: receive the communication indicating the number of loads supported by each of the multiple servers; determine each of the multiple servers for potential support by receiving an address identifying each of the servers; identify each of the multiple servers through the received address and each of the loads supported by each of the servers; and write the value corresponding to the number of loads supported by at least one of the multiple servers within a register internal to the backup power source. The processor 502 may proceed to execute instruction 514 and/or instruction 516 to: determine the amount of power available at the backup power source; and if the amount of available power is not enough to enable support to the multiple servers and in turn their respective loads, the backup power source may continue to charge a battery module until the available power is enough to handle the multiple servers. The processor 502 may proceed to deliver the power to the multiple servers to enable each of the multiple servers to support their multiple loads.

The machine-readable storage medium 504 includes instructions 506-518 for the processor 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

In summary, examples disclosed herein provide a power system for support between multiple backup power sources and multiple nodes. The power system provides a centralized communication structure that provides flexibility to supporting the various nodes and reduces bus traffic, thus providing an overall more efficient power system.

We claim:

1. A system comprising:
multiple backup power sources; and
a centralized controller external to the backup power sources and to multiple nodes, the centralized controller to:
receive a communication associated with the multiple nodes, via a communication bus, the communication indicating a number of hardware loads supported by the multiple nodes;
communicate with the backup power sources;
determine which of the backup power sources is to deliver power to the multiple nodes based on the received communication associated with the multiple nodes and the communicating with the backup power sources; and
control the backup power sources to deliver power to the multiple nodes based on the determination, the power delivery being via an electrically conductive path distinct from the communication bus;
a software-based virtual controller operating on a chassis manager external to the backup power sources, the centralized controller, and the multiple nodes, the virtual controller to communicate with each of the nodes, wherein the virtual controller transmits the communication to the centralized controller via the communication bus, and the communication includes the number of hardware loads supported by the multiple nodes; and
the centralized controller further comprising:
a register to hold a value corresponding to the number of hardware loads supported by the multiple nodes, and the centralized controller to determine charge available at the backup power sources.

2. The system of claim 1 wherein the multiple nodes includes multiple servers, each server supporting multiple hardware loads wherein the centralized controller receives communications from the virtual controller including load information at each server.

3. The system of claim 1 further comprising:
the multiple nodes, each of the multiple nodes supporting multiple hardware loads.

4. The system of claim 1, wherein each of the backup power sources is configured to deliver power to each of the nodes.

5. The system of claim 1, wherein the centralized controller to:
receive communication, via the communication bus, indicating a potential power outage at one or more of the multiple nodes; and
control the backup power sources to deliver power to the multiple nodes based on the potential power outage.

6. A method, executable by a centralized controller, the method comprising:
receiving, via a communication bus, a communication associated with multiple servers, wherein the communication includes a number of hardware loads associated with the multiple servers;
communicating with multiple backup power sources, which are external to the centralized controller and to the multiple servers, upon receiving the communication;
determining an amount of power available at each backup power source;
selecting one or more of the backup power sources to deliver power to the multiple servers, the selecting based on the received communication associated with the multiple servers and the communicating with the backup power sources; and
controlling power delivery via an electrically conductive path distinct from the communication bus to the multiple servers from the selected one or more backup power sources for support of the number of hardware loads;
wherein the communication is received from a software-based virtual controller operating on a chassis manager external to the backup power sources, the centralized controller, and the multiple nodes, the virtual controller communicating with each of the nodes and transmitting the communication to the centralized controller via the communication bus, and the communication including the number of hardware loads supported by the multiple nodes.

7. The method of claim 6 wherein if the amount of power available is below a power consumption by the number of hardware loads associated with the multiple servers, the method further comprises:
charging the backup power sources until the power available at the backup sources reaches the power consumption by the number of hardware loads associated with the multiple servers.

8. The method of claim 6 wherein receiving the communication associated with the multiple servers further comprises:
writing the number of hardware loads into a register internal to the centralized controller.

9. The method of claim 6 wherein receiving the communication associated with the multiple severs further comprises:
receiving an address of each of the multiple servers.

10. The method of claim 6, wherein each of the backup power sources is configured to deliver power to each of the servers.

11. The method of claim 6, further comprising:
receiving communication, via the communication bus, indicating a potential power outage at one or more of the multiple servers;
selecting the one or more backup power sources based on the potential power outage; and
controlling the selected one or more backup power sources to deliver power to the multiple servers based on the potential power outage.

12. A non-transitory machine-readable storage medium comprising instructions that when executed by a processor of a centralized controller cause the processor to:
receive, via a communication bus, a communication indicating a number of hardware loads supported by multiple nodes;
communicate with multiple backup power sources, external to the centralized controller and the multiple nodes, upon receiving the communication;
determine an amount of power available at each backup power source;
select one or more of the backup power sources to deliver power to the multiple nodes, the selecting based on the received communication indicating the number of hardware loads supported by the multiple nodes and the communicating with the backup power sources; and
control power delivery via an electrically conductive path distinct from the communication bus to the multiple nodes from the selected one or more backup power sources;
wherein:
the communication is received from a software-based virtual controller operating on a chassis manager external to the backup power sources, the centralized controller, and the multiple nodes, the virtual controller communicating with each of the nodes and transmitting the communication to the centralized controller via the communication bus, and the communication including the number of hardware loads supported by the multiple nodes; and
to receive the communication indicating the number of hardware loads supported by the multiple nodes, the instructions when executed by the processor cause the processor to:
write a value corresponding to the number of hardware loads into a register at the centralized controller prior to the determination of the amount of power available at each backup power source.

13. The non-transitory machine-readable storage medium including the instructions of claim 12 wherein to receive the communication indicating the number of hardware loads supported by the multiple nodes, the instructions when executed by the processor cause the processor to:
receive an address associated with each of the multiple nodes; and
identify each of the hardware loads supported by each of the multiple nodes.

14. The non-transitory machine-readable storage medium including the instructions of claim 12 wherein if the amount of power available at the backup power source is below a power consumption by the number of hardware loads, the instructions when executed by the processor cause the processor to:
charge the backup power source until the power available at the backup power source reaches the power consumption by the number of hardware loads.

15. The non-transitory machine-readable storage medium including the instructions of claim 12, wherein each of the backup power sources is configured to deliver power to each of the nodes.

16. The non-transitory machine-readable storage medium including the instructions of claim 12, wherein the instructions when executed by the processor cause the processor to:
receive communication, via the communication bus, indicating a potential power outage at one or more of the multiple nodes; and
select the one or more backup power sources based on the potential power outage.

* * * * *